(12) United States Patent
Tsujimura et al.

(10) Patent No.: US 8,385,736 B2
(45) Date of Patent: Feb. 26, 2013

(54) IMAGING APPARATUS

(75) Inventors: Ichiro Tsujimura, Osaka (JP); Takahiro Atsuta, Chiba (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 12/805,285

(22) Filed: Jul. 22, 2010

(65) Prior Publication Data

US 2011/0064400 A1   Mar. 17, 2011

(30) Foreign Application Priority Data

Sep. 14, 2009 (JP) ................................. 2009-211915

(51) Int. Cl.
*G03B 17/20* (2006.01)
(52) U.S. Cl. .......................... 396/296; 396/386; 348/341
(58) Field of Classification Search .................. 396/152, 396/296, 386
See application file for complete search history.

(56) References Cited

U.S. PATENT DOCUMENTS

| | | | | |
|---|---|---|---|---|
| 4,941,069 | A  * | 7/1990 | Danenberg et al. ............ | 361/809 |
| 6,493,049 | B2 * | 12/2002 | Iwane ............................. | 349/86 |
| 6,714,244 | B1 * | 3/2004 | Takebayashi et al. ... | 348/333.02 |
| 7,039,310 | B2 * | 5/2006 | Haraguchi et al. ............. | 396/147 |
| 7,702,237 | B2 * | 4/2010 | Iwane ............................ | 396/287 |
| 2001/0033480 | A1 * | 10/2001 | Wakabayashi et al. ......... | 362/31 |

FOREIGN PATENT DOCUMENTS

JP     2004-212792     7/2004

* cited by examiner

*Primary Examiner* — Clayton E Laballe
*Assistant Examiner* — Leon W Rhodes, Jr.
(74) *Attorney, Agent, or Firm* — Rader, Fishman & Grauer PLLC

(57) ABSTRACT

An imaging apparatus includes: optical finder means for introducing subject light having passed through an image capturing optical system onto a predetermined mirror at a first angle and guiding light reflected off the predetermined mirror to a finder window; a liquid crystal display disposed in an optical path of the subject light in the optical finder means; and illumination means for illuminating the liquid crystal display with light having a predetermined wavelength, wherein scattered light produced in the liquid crystal display illuminated with the light from the illumination means is incident on the predetermined mirror at a second angle, the finder window is disposed in a path of the scattered light reflected off the predetermined mirror, and the predetermined mirror has reflection characteristics in which spectral reflectance associated with the predetermined wavelength of the light incident at the second angle is lower than the spectral reflectance associated with the predetermined wavelength of the light incident at the first angle.

7 Claims, 8 Drawing Sheets

IMAGING APPARATUS

BACKGROUND OF THE INVENTION

1. Field of the Invention

The present invention relates to an imaging device with an optical finder that guides subject light having passed through an image capturing optical system to a finder window.

2. Description of the Related Art

There are known single lens reflex cameras (imaging apparatus) with an optical finder that guides a subject optical image having passed through an image capturing lens to a finder window.

In an imaging apparatus of this type, a variety of methods for superimposing information, such as an AF area, on a subject optical image and displaying the superimposed image on a screen of the finder window, what is called methods for presenting a superimposed indication, have been proposed. An example of the proposed methods for presenting a superimposed indication uses a liquid crystal display disposed above a focus plate. In this method, it is preferable that the superimposed indication is brightly presented to ensure the visibility thereof in a dark environment by providing a liquid crystal layer in which polymer dispersed liquid crystal device is sealed and introducing illumination light from an LED or any other suitable device through a side surface of the layer so that the illumination light is scattered at an indication presented portion in a diffused state in the liquid crystal layer.

When the polymer dispersed liquid crystal layer is illuminated with the illumination light, however, not only is the scatter light produced at the location where the superimposed indication is presented, but also a very small degree of residual diffusion state produces a non-negligible amount of scattered light at locations where no superimposed indication is presented in a transparent state (transmitting state). The two types of scattered light exit out of the liquid crystal display, are reflected off, for example, a pentamirror, and reach the finder window. The latter type of scattered light disadvantageously produces a ghost image in an upper portion of the screen in the finder window.

A technique for eliminating such a ghost image is disclosed, for example, in JP-A-2004-212792. In the disclosed technique, a glass plate disposed above the liquid crystal display reflects scattered light that may produce a ghost image and hence prevents (blocks) the scattered light from passing through the glass plate. The visibility of the ghost image in the finder window is thus lowered.

SUMMARY OF THE INVENTION

In the technique disclosed in JP-A-2004-212792, however, providing the light-blocking glass plate increases the number of parts, complicates the optical finder, and increases the size thereof.

Thus, it is desirable to provide an imaging apparatus that does not complicate an optical finder or increase the size thereof but can lower the visibility of a ghost image in a finder window due to scattered light produced in a liquid crystal display.

An embodiment of the invention is directed to an imaging apparatus including optical finder means for introducing subject light having passed through an image capturing optical system onto a predetermined mirror at a first angle and guiding light reflected off the predetermined mirror to a finder window, a liquid crystal display disposed in an optical path of the subject light in the optical finder means, and illumination means for illuminating the liquid crystal display with light having a predetermined wavelength. Scattered light produced in the liquid crystal display illuminated with the light from the illumination means is incident on the predetermined mirror at a second angle. The finder window is disposed in a path of the scattered light reflected off the predetermined mirror. The predetermined mirror has reflection characteristics in which spectral reflectance associated with the predetermined wavelength of the light incident at the second angle is lower than that of the light incident at the first angle.

According to the embodiment of the invention, the visibility of a ghost image in the finder window due to the scattered light produced in the liquid crystal display can be lowered without a complicated configuration of the optical finder or increase in the size thereof.

DESCRIPTION OF THE PREFERRED EMBODIMENTS

Embodiment

[Configuration of Key Portion of Imaging Apparatus]

Figure 1:
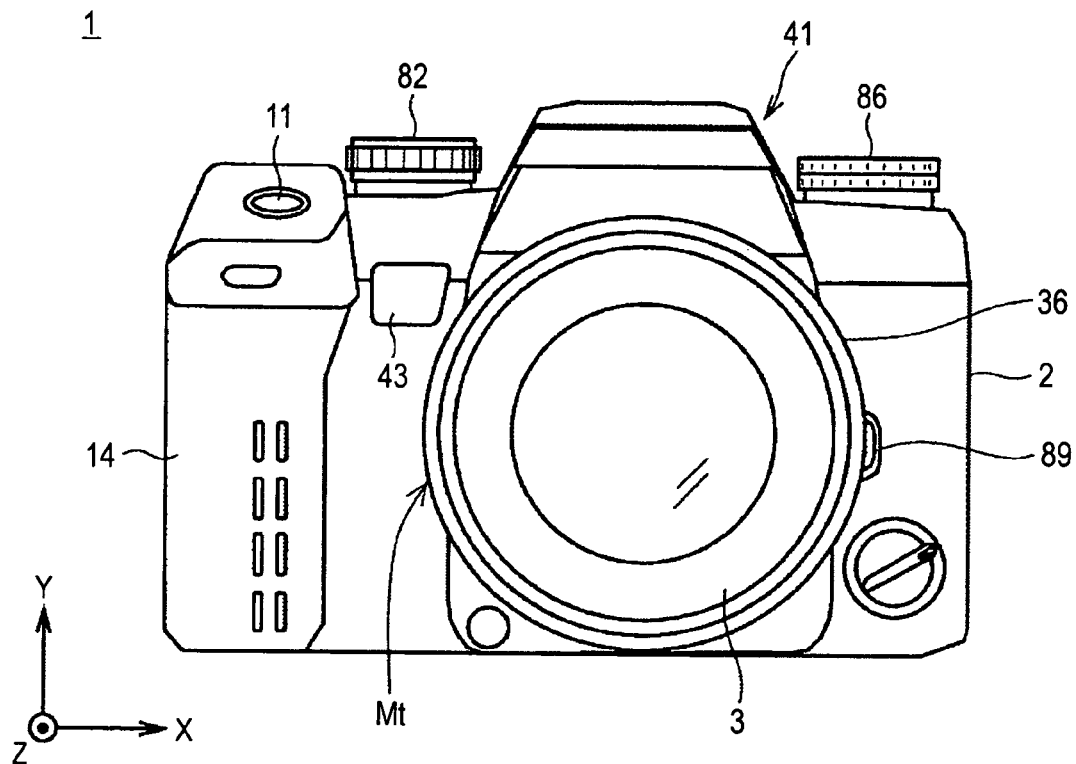
FIG. 1 is a front view showing an exterior configuration of an imaging apparatus according to an embodiment of the invention.
Figure 2:
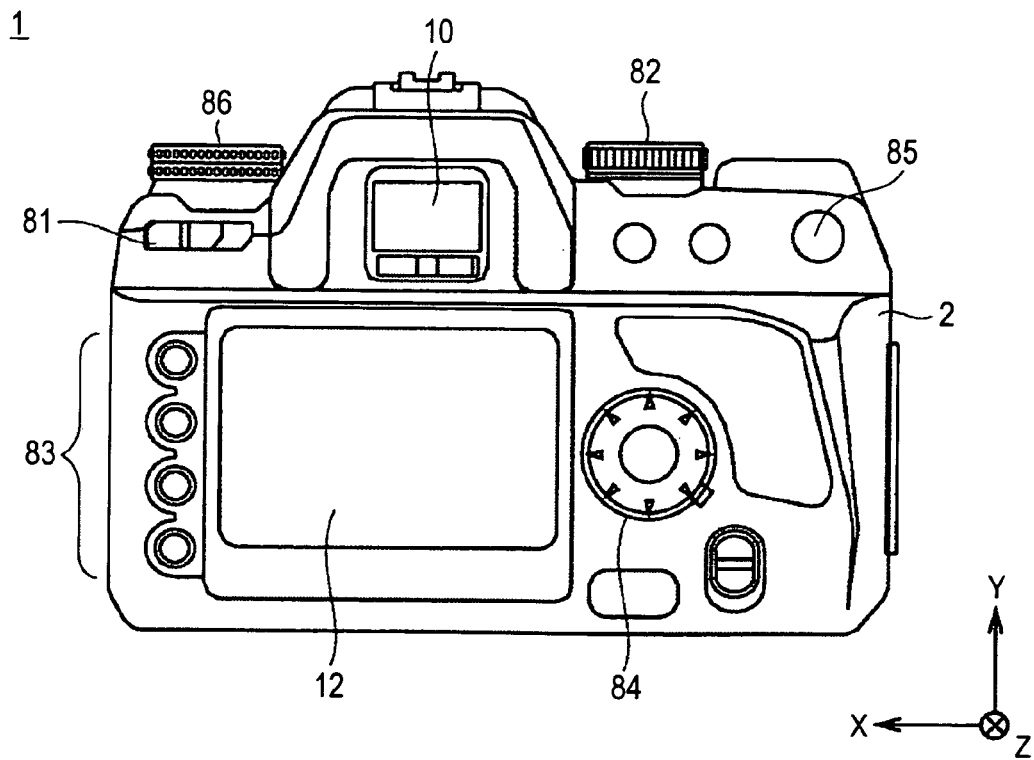
FIG. 2 is a rear view showing the exterior configuration of the imaging apparatus.

FIGS. 1 and 2 show an exterior configuration of an imaging apparatus 1 according to an embodiment of the invention. FIG. 1 is a front exterior view of the imaging apparatus 1, and FIG. 2 is a rear exterior view of the imaging apparatus 1. The imaging apparatus 1 is configured as a lens-interchangeable single-lens reflex digital camera.

As shown in FIG. 1, the imaging apparatus 1 includes a camera body 2. An interchangeable image capturing lens unit (interchangeable lens) 3 can be attached and detached to and from the camera body 2.

The image capturing lens unit 3 primarily includes a lens barrel 36, and a lens group 37 (see FIG. 3), a diaphragm, and other components provided in the lens barrel 36. The lens group 37, which works as an image capturing optical system, includes a focus lens that moves in the optical axis direction to change the focus position.

The camera body 2 includes an annular mount Mt which is disposed in a substantially central portion of the front side and to which the image capturing lens unit 3 is attached. The camera body 2 further includes an attaching and detaching button 89 that is disposed in the vicinity of the annular mount Mt and used to attach and detach the image capturing lens unit 3.

The camera body 2 further includes a mode setting dial 82 in an upper left portion when viewed from the front and a control value setting dial 86 in an upper right portion when viewed from the front. Operating the mode setting dial 82 allows a user to set a variety of camera operation modes (switch a camera operation mode among a variety of modes) (including a variety of image capturing modes (such as a portrait image capturing mode, a scenery image capturing mode, and a fully automatic image capturing mode), a playback mode for reproducing a captured image, and a communication mode for sending and receiving data to and from an external apparatus). Operating the control value setting dial 86 allows the user to set control values in the variety of image capturing modes.

The camera body 2 further includes a grip 14 that is disposed at the left end when viewed from the front and gripped by a user who is capturing an image. A release button 11 for instructing the camera to start light exposure is provided on the upper side of the grip 14. The grip 14 has a battery compartment and a card compartment provided therein. The battery compartment houses a nickel hydrogen rechargeable battery or any other suitable secondary battery or an alkaline dry battery or any other suitable primary battery as a power source of the camera, and the card compartment detachably houses a memory card 90 (see FIG. 3) for recording image data of captured images.

The release button 11 is a two-stage detection button capable of detecting two states, a half-pressed state (S1 state) and a fully-pressed state (S2 state). When the release button 11 is pressed halfway into the S1 state, preparation actions (such as an AF control action and an AE control action) for acquiring a still image of a subject to be recorded (final captured image) are carried out. When the release button 11 is further pressed into the S2 state, actions of capturing the final captured image are carried out (a series of actions including exposing an imaging device 5 (which will be described later) to an image of the subject (an optical image of the subject) and performing predetermined image processing on an image signal produced by the light exposure).

In FIG. 2, a finder window (eyepiece window) 10 is provided in a substantially upper central portion of the back side of the camera body 2. The user who is capturing an image can look into the finder window 10 and visually recognize the optical image of the subject guided through the image capturing lens unit 3 to determine a composition. That is, a composition can be determined by using an optical finder 17 (see FIG. 4).

In FIG. 2, a backside monitor 12 is provided in a substantially central portion of the back side of the camera body 2. The backside monitor 12 is formed, for example, of a color liquid crystal display (LCD). The backside monitor 12 can display a menu screen for setting image capturing and other conditions and reproduce and display in the playback mode a captured image recorded on the memory card 90. When the operator chooses to determine a composition by using live-view display (electronic finder) instead of using the optical finder, the backside monitor 12 displays a plurality of time-series images (that is, video images) acquired by an imaging device 7 (which will be described later) as live-view images.

A main switch 81 is provided to the upper left of the backside monitor 12. The main switch 81 is formed of a two-contact slidable switch. When the contact is set to a left "OFF" position, the power source is turned off, whereas when the contact is set to a right "ON" position, the power source is turned on.

A direction selectable key 84 is provided to the right of the backside monitor 12. The direction selectable key 84 has a circular operation button and detects four directional pressing operations, up, down, right, and left, on the operation button and another four directional pressing operations, upper right, upper left, lower right, and lower left, on the operation button. The direction selectable key 84 detects a pressing operation on a central push button as well as the above eight directional pressing operations.

A group of setting buttons 83 is provided to the left of the backside monitor 12. The group of setting buttons 83 is formed of a plurality of buttons for performing various operations including setting parameters on the menu screen and deleting images.

Figure 3:
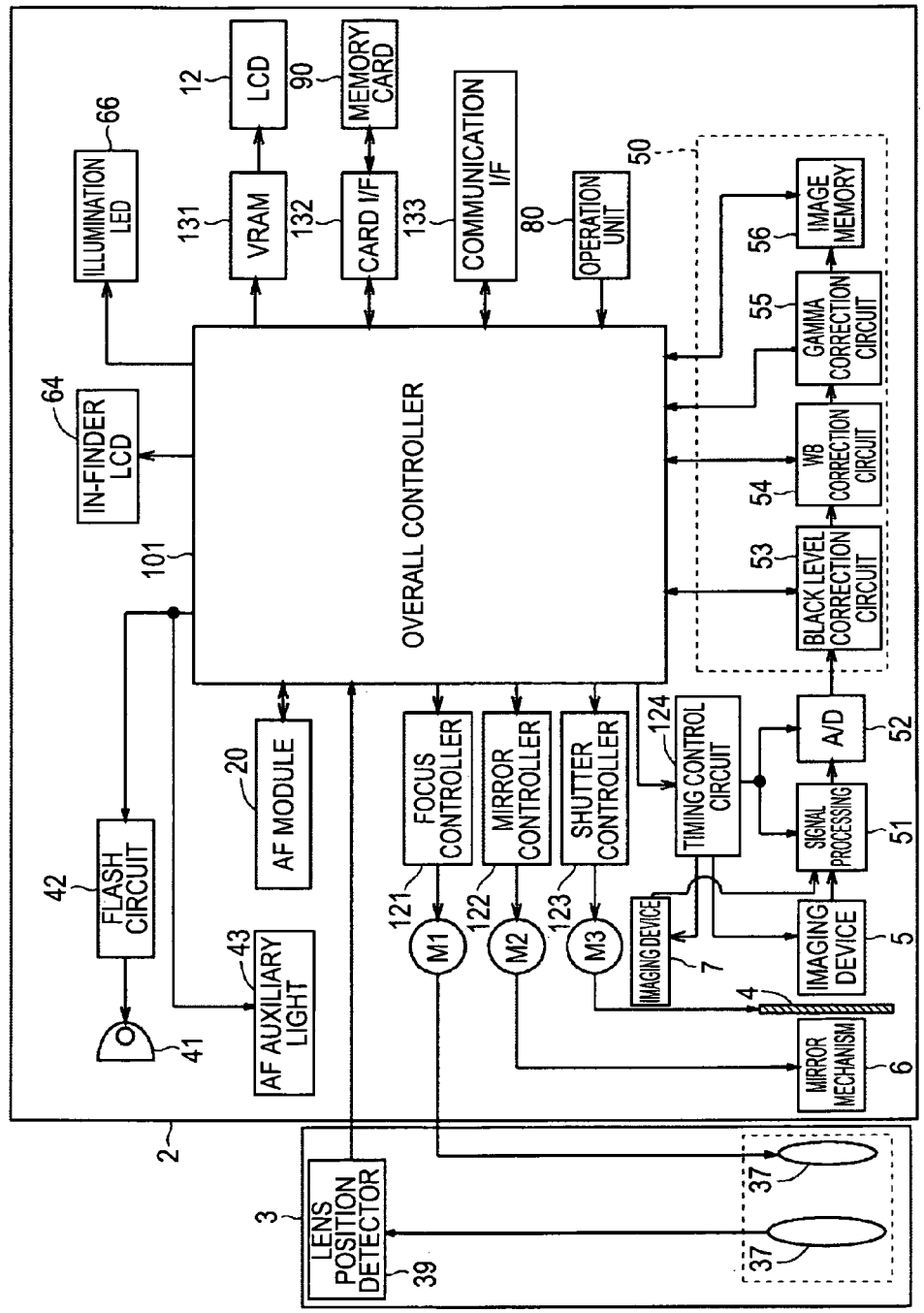
FIG. 3 is a block diagram showing a functional configuration of the imaging apparatus.

The functions of the imaging apparatus 1 will be summarized with reference to FIG. 3. FIG. 3 is a block diagram showing a functional configuration of the imaging apparatus 1.

As shown in FIG. 3, the imaging apparatus 1 includes an operation unit 80, an overall controller 101, a focus controller 121, a mirror controller 122, a shutter controller 123, a timing control circuit 124, and a digital signal processing circuit 50.

The operation unit 80 is formed of a variety of buttons, switches, and other components including the release button 11 (see FIG. 1). The overall controller 101 carries out a variety of actions in response to an input operation performed by the operator through the operation unit 80.

The overall controller 101 is formed of a microcomputer and primarily includes a CPU, a RAM, and a ROM.

The overall controller 101 reads a program stored in the ROM and executes the program in the CPU to carry out a variety of functions software-wise. For example, the overall controller 101 cooperates with an AF module 20, the focus controller 121, and other components to carry out focus control in which the position of the focus lens is controlled. The overall controller 101 uses the focus controller 121 to carry out an AF action based on a subject's focus state detected by the AF module 20. The AF module 20 can use light introduced via a mirror mechanism 6 along with a phase-difference-based focus state detection method (phase-difference-based AF) to detect the subject's focus state.

The focus controller 121 produces a control signal based on a signal inputted from the overall controller 101 and drives a motor M1 in accordance with the control signal to move the focus lens, which is part of the lens group 37 in the image capturing lens unit 3. The position of the focus lens is detected by a lens position detector 39 in the image capturing lens unit 3, and data representing the position of the focus lens is sent to the overall controller 101. The focus controller 121, the overall controller 101, and other components thus control the motion of the focus lens in the optical axis direction.

The mirror controller 122 switches the state of the mirror mechanism 6 between a state in which it retracts from the optical path (mirror-up state) and a state in which it blocks the optical path (mirror-down state). The mirror controller 122 switches the state of the mirror mechanism 6 between the mirror-up state and the mirror-down state by producing a control signal based on a signal inputted from the overall controller 101 and driving a motor M2 in accordance with the control signal.

The shutter controller 123 produces a control signal based on a signal inputted from the overall controller 101 and drives a motor M3 in accordance with the control signal to open and close a shutter 4.

The timing control circuit 124 supplies timing signals to the imaging device 5 and other components.

The imaging device 5, which is formed, for example, of a CMOS sensor, converts the optical image of the subject into an electric signal in a photoelectric conversion process, and produces an image signal related to the final captured image (image signal to be recorded). The imaging device 5 is also described as an imaging device for recording images (for acquiring images to be recorded).

The imaging device 5 is exposed to the subject image focused on a light receiving surface (accumulates electric charge produced in the photoelectric conversion process) in response to drive control signals (accumulation start signal and accumulation end signal) inputted from the timing control circuit 124 and produces an image signal related to the subject image. The imaging device 5 outputs the image signal to a signal processor 51 including an AGC (Automatic Gain Control) circuit in response to a readout control signal inputted from the timing control circuit 124. A timing signal (sync signal) from the timing control circuit 124 is also inputted to the signal processor 51 and an A/D (analog/digital) conversion circuit 52.

The signal processor 51 performs predetermined analog signal processing (such as optimizing the brightness level of the image, for example, by increasing the gain in the AGC circuit) on the image signal acquired by the imaging device 5, and the A/D conversion circuit 52 converts the image signal having undergone the analog signal processing into digital image data (image data). The image data are then inputted to the digital signal processing circuit 50.

The digital signal processing circuit 50 performs digital signal processing on the image data inputted from the A/D conversion circuit 52 and produces image data related to the captured image. The digital signal processing circuit 50 includes a black level correction circuit 53, a white balance (WB) correction circuit 54, a gamma correction circuit 55, and an image memory 56.

The black level correction circuit 53 corrects the black level of each pixel data that forms the image data outputted from the A/D conversion circuit 52 to a reference black level. The WB correction circuit 54 adjusts the white balance of the image. The gamma correction circuit 55 converts the grayscales of the captured image. The image memory 56 is a high-speed accessible image memory for temporarily storing the produced image data. The image memory 56 has a capacity for storing image data corresponding to a plurality of frames.

At the time of final image capturing, the image data temporarily stored in the image memory 56 undergo image processing (such as compression) as appropriate in the overall controller 101 and are then stored on the memory card 90 via a card I/F 132.

The image data temporarily stored in the image memory 56 are also transferred by the overall controller 101 to a VRAM 131 as appropriate, and an image based on the image data is displayed on the backside monitor 12. The backside monitor 12 enables, for example, confirmation display (after view) for confirming an image just having been captured and playback display for reproducing an image having been captured.

Figure 4:
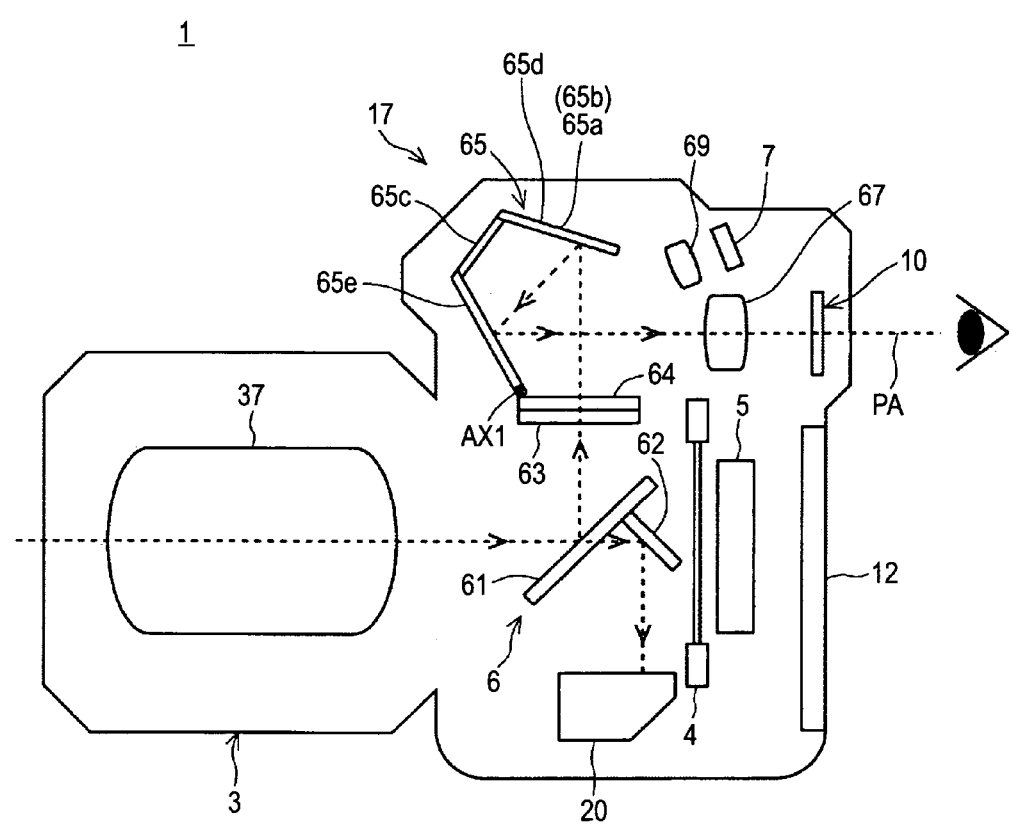
FIG. 4 is a cross-sectional view showing a composition determining action using an OVF.

The imaging apparatus 1 further includes the imaging device 7 in addition to the imaging device 5 (see FIG. 4). The imaging device 7 is dedicated to acquiring what are called live-view images (acquiring video images). The imaging device 7 has the same configuration as that of the imaging device 5. The imaging device 7, however, only needs to have resolution high enough to produce a live-view image (video image) signal, and the number of pixels and the power consumption of the imaging device 7 are typically smaller than those of the imaging device 5.

The same signal processing as that performed on an image signal acquired by the imaging device 5 is performed on an image signal acquired by the imaging device 7. That is, an image signal acquired by the imaging device 7 undergoes the predetermined processing in the signal processor 51, is converted into digital data in the A/D conversion circuit 52, undergoes the predetermined image processing in the digital signal processing circuit 50, and is stored in the image memory 56.

The time-series image data acquired by the imaging device 7 and stored in the image memory 56 are sequentially transferred by the overall controller 101 to the VRAM 131 as appropriate, and images based on the time-series image data are displayed on the backside monitor 12. Video image-like display (live-view display) for determining a composition is thus provided.

The imaging apparatus 1 further includes a communication I/F 133 and can send and receive data to and from an apparatus (personal computer, for example) connected to the interface 133.

The imaging apparatus 1 further includes a flashlight. 41, a flashlight control circuit 42, and an AF auxiliary light emitter 43. The flashlight 41 is a light source used, for example, when the subject does not have enough brightness. Turning on and off the flashlight, the duration over which the flashlight is kept turned on, and other parameters are controlled by the flashlight control circuit 42, the overall controller 101, and other components. The AF auxiliary light emitter 43 is an auxiliary light source for the AF action. Turning on and off the AF auxiliary light emitter 43, the duration over which the AF auxiliary light emitter 43 is kept turned on, and other parameters are controlled by the overall controller 101 and other components.

The imaging apparatus 1 further includes a light-transmissive in-finder LCD (Liquid Crystal Display) 64 and an illumination LED 66 disposed in an optical path Qa (see FIG. 7) of subject light in the optical finder 17 (see FIG. 4), which will be described later.

Figure 11:
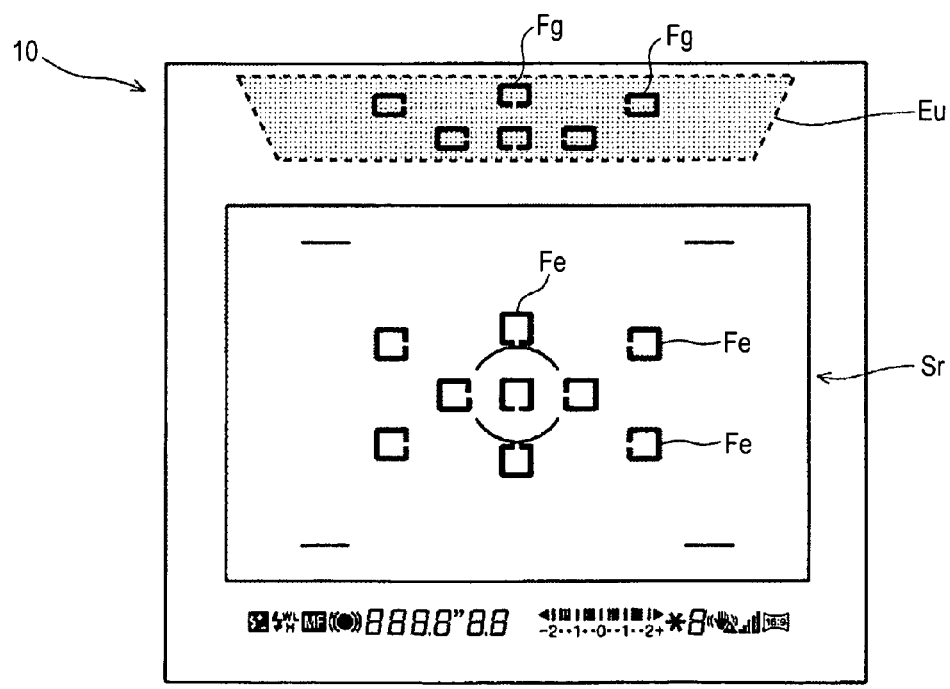
FIG. 11 is a descriptive diagram for describing a ghost image produced in a finder window.

On the in-finder LCD 64 is displayed, for example, a plurality of AF areas Fe where the AF module 20 can detect the subject's focus state within an image capturing range, such as a screen Sr in the finder window 10 shown in FIG. 11. The AF areas Fe are superimposed on a subject optical image, and the resultant superimposed image is displayed. The in-finder LCD 64 is configured as a polymer dispersed liquid crystal display formed, for example, of two glass substrates, each of which has a transparent electrode, and a liquid crystal layer therebetween in which polymer dispersed liquid crystal molecules are sealed. The in-finder LCD 64 includes a plurality of display segments. In the thus configured in-finder LCD 64, controlling an electric field applied to the liquid crystal layer allows a diffusion state of the liquid crystal molecules to be switched between a light transmitting state and a light diffusing state so that the AF areas Fe and other indications are displayed or not.

The illumination LED 66 functions as a light source for illuminating the in-finder LCD 64 with light having a wavelength corresponding to red (wavelength of approximately 650 nm, for example). The illumination light from the illumination LED 66 causes the AF areas Fe and other indications (see FIG. 11) displayed on the screen in the finder window 10 to give off red light, whereby the visibility of the superimposed indication is improved when the operator looks into the finder window 10 in a dark environment.

[Image Capturing Action of Imaging Apparatus 1]

An image capturing action including a composition determining action in the imaging apparatus 1 will next be described. As described above, the imaging apparatus 1 allows the operator to determine a composition (framing) by using the optical finder (also referred to as an optical viewfinder (OVF)) formed, for example, of a finder optical system or by using live-view images displayed on the backside monitor 12. A finder function realized by using the imaging device 7 and the backside monitor 12 is referred to as an electronic viewfinder (EVF) because an optical image of a subject is converted into electronic data and then visualized. The imaging apparatus 1 further includes a switch 85 (FIG. 2) for choosing the viewing mode between an optical finder enabling mode (hereinafter also referred to as an "OVF mode") and an electronic viewfinder (electronic finder) enabling mode (hereinafter also referred to as an "EVF mode").

Figure 5:
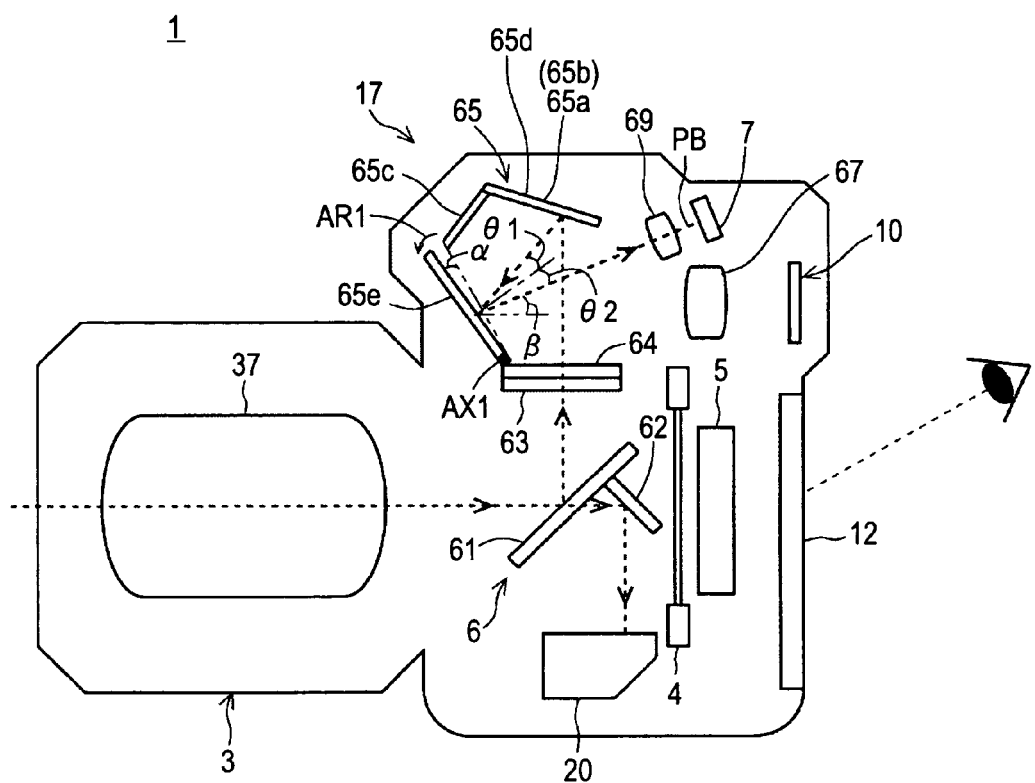
FIG. 5 is a cross-sectional view showing a composition determining action using an EVF.
Figure 6:
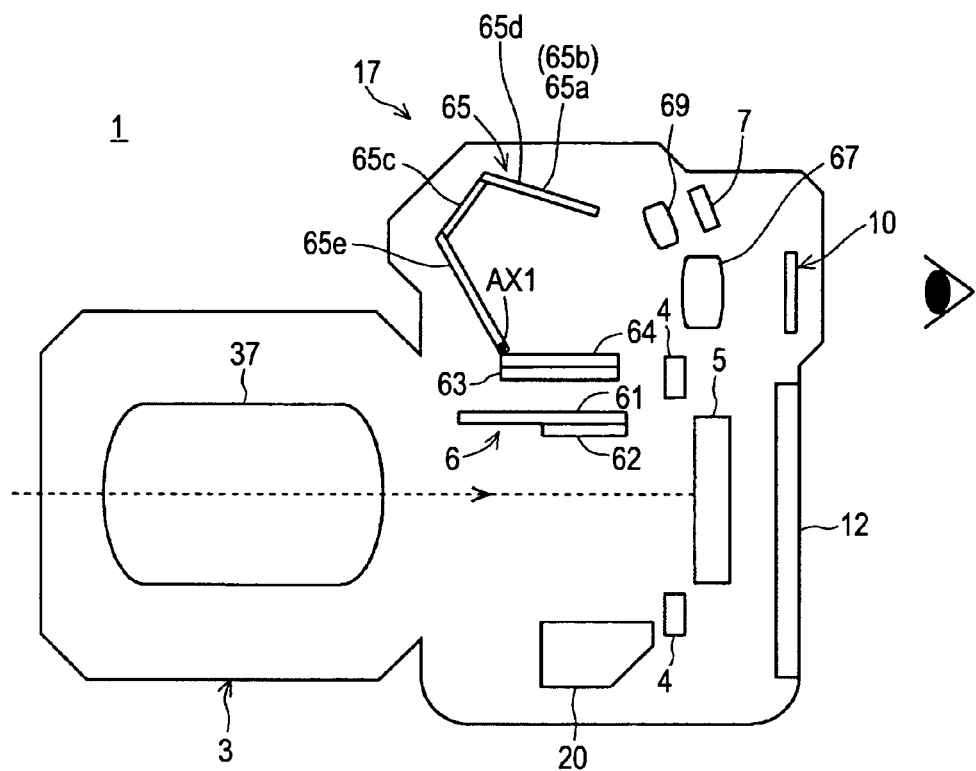
FIG. 6 is a cross-sectional view showing a state in which an imaging device is exposed to light.

FIGS. 4 and 5 are cross-sectional views of the imaging apparatus 1. FIG. 4 shows a composition determining action using the OVF, and FIG. 5 shows a composition determining action using the EVF. FIG. 6 is a cross-sectional view showing a state in which the imaging device 5 is exposed to light.

As shown in FIG. 4 and other figures, the mirror mechanism 6 is disposed in the optical path (image capturing optical path) starting from the image capturing lens unit 3 to the imaging device 5. The mirror mechanism 6 includes a primary mirror 61 (primary reflection surface) that reflects the light from the image capturing optical system upward. Part or all of the primary mirror 61 is formed, for example, of a half-silvered mirror, which transmits part of the light from the image capturing optical system. The mirror mechanism 6 further includes a secondary mirror 62 (secondary reflection surface) that reflects the light having passed through the primary mirror 61 downward. The light reflected off the secondary mirror 62 downward is guided to and incident on the AF module 20 and used in the phase-difference-based AF action.

In any of the image capturing modes, the mirror mechanism 6 is in the mirror-down state before the release button 11 is pressed into the fully-pressed state S2, in other words, in a composition determining action (see FIGS. 4 and 5). In this process, a subject image from the image capturing lens unit 3 is reflected off the primary mirror 61 upward and incident on a pentamirror 65 as a light flux to be viewed. The pentamirror 65 has a plurality of mirrors (reflection surfaces) and hence has a capability of adjusting the orientation of the subject image. The path along which the light flux to be viewed travels after it impinges on the pentamirror 65 depends on which of the two modes described above (that is, either the OVF mode or the EVF mode) is used to determine a composition. The operator can determine a composition by choosing a desired one.

On the other hand, when the release button 11 is pressed into the fully-pressed state S2, the mirror mechanism 6 is driven into the mirror-up state, and a light exposure action is initiated (see FIG. 6). Actions of acquiring a still image of the subject to be recorded (also referred to as a final captured image) are the same irrespective of which of the two modes described above (that is, the OVF mode and the EVF mode) is used to determine a composition.

Specifically, at the time of light exposure, the mirror mechanism 6 retracts from the image capturing optical path, as shown in FIG. 6. In detail, the primary mirror 61 and the secondary mirror 62 retract upward not to block the light (subject image) from the image capturing optical system, and the light from the image capturing lens unit 3 reaches the imaging device 5 in synchronization with the timing at which the shutter 4 is opened. The imaging device 5 produces an image signal of the subject based on the received light flux in a photoelectric conversion process. A captured image related to the subject (captured image data) is thus produced by introducing the light from the subject to the image device 5 through the image capturing lens unit 3.

Actions carried out in each of the two composition determining methods will next be described.

Composition determining actions in the OVF mode will first be described.

As shown in FIG. 4, when the primary mirror 61 and the secondary mirror 62 in the mirror mechanism 6 are positioned in the optical path of the subject image from the image capturing lens unit 3, the subject image is guided via the primary mirror 61, the pentamirror 65, and an eyepiece lens 67 to the finder window 10. The optical finder 17 including the pentamirror 65 and the eyepiece lens 67 thus guides the light flux to be viewed, which is the subject light having passed through the image capturing optical system and having been reflected off the primary mirror 61, along an optical path PA to the finder window 10, whereby the subject can be displayed in the finder window 10.

In detail, the light from the image capturing lens unit 3 is reflected off the primary mirror 61 and redirected upward, is focused on a focus plate 63, and passes through the focus plate 63 and the in-finder LCD 64. The light having passed through these components is incident on the pentamirror 65 and further redirected, and then passes through the eyepiece lens 67 toward the finder window 10 (see the optical path PA shown in FIG. 4). The subject image having passed through the finder window 10 then reaches an eye of the user who is capturing an image (viewer) and is visually recognized. That is, the user who is capturing an image can look into the finder window 10 to check the subject image.

The pentamirror 65 includes two mirrors 65a and 65b shaped into a triangular roof (roof mirror), a mirror 65c fixed to the roof mirror (roof surfaces) 65a/65b, and a mirror 65e that can be rotated around an axis AX1 (hereinafter also referred to as a "movable mirror") by an actuator (motor, for example) (not shown). The two mirrors 65a and 65b, which form the triangular roof, are formed by plastic molding into an integrated part 65d. The light reflected off the primary mirror 61 and redirected upward is reflected off the roof mirror 65a/65b, which forms first and second reflection surfaces of the pentamirror 65, so that the light is reversed in the horizontal direction, and is reflected again off the movable mirror 65e, which forms a third reflection surface, so that the light is reversed in the vertical direction. The light then reaches an eye of the user who is capturing an image. As described above, the optical image having been reversed by the image capturing lens unit 3 in the horizontal and vertical directions is further reversed by the pentamirror 65 in the horizontal and vertical directions. In this way, the user who is capturing an image can view the subject image in the optical finder 17 in the same up/down/right/left orientation as that of the actual subject.

The light having passed through the primary mirror 61 is reflected off the secondary mirror 62 and redirected downward, and then incident on the AF module 20. The AF module 20, the focus controller 121, and other components use the light incident on the AF module 20 via the primary mirror 61 and the secondary mirror 62 to carry out an AF action.

Composition determining actions in the EVF mode will next be described.

In this case as well, the primary mirror 61 and the secondary mirror 62 in the mirror mechanism 6 are positioned in the optical path of the subject image from the image capturing lens unit 3, as shown in FIG. 5. The light from the image capturing lens unit 3 is reflected off the primary mirror 61 and redirected upward, is focused on the focus plate 63, and passes through the focus plate 63 and the in-finder LCD 64.

In the composition determining actions in the EVF mode, however, the light having passed through the focus plate 63 and the in-finder LCD 64 is incident on the pentamirror 65 and further redirected, passes through an imaging lens 69 (imaging optical system), and is focused again on an imaging surface of the imaging device 7 (see an optical path PB shown in FIG. 5). The light reflected off the primary mirror 61 and redirected upward is reflected off the roof mirror 65a/65b so that the light is reversed in the horizontal direction, is reflected off the movable mirror 65e so that the light is reversed in the vertical direction, passes through the imaging lens 69 so that the light is reversed in the horizontal and vertical directions, and reaches the imaging device 7.

In more detail, as seen by comparing FIG. 5 with FIG. 4, the angle of the movable mirror 65e (the angle with respect to the camera body 2) in FIG. 5 differs from that in FIG. 4. Specifically, the movable mirror 65e has pivoted from the state shown in FIG. 4 by a predetermined angle $\alpha$ in the direction of the arrow AR1 around the axis AX1 located on the lower end side of the movable mirror 65e.

The change in the angle of the movable mirror 65e changes the angle of reflection of the light (light flux to be viewed) reflected off the movable mirror 65e, and the traveling path of the light reflected off the mirror 65e is changed. Specifically, the angle of incidence $\theta 1$ and the angle of reflection $\theta 2$ with respect to the movable mirror 65e are relatively smaller than those in the state shown in FIG. 4. As a result, the light reflected off the movable mirror 65e does not travel along the optical path toward the eyepiece lens 67 but travels along an optical path closer to the roof mirror 65a/65b, passes through the imaging lens 69, and reaches the imaging device 7. That is, the imaging device 7 can produce an image signal when it receives the subject light along the optical path PB having a section common to the optical path PA in the optical finder 17. The imaging lens 69 and the imaging device 7 are disposed in a position above the eyepiece lens 67 so that the light flux traveling from the movable mirror 65e to the eyepiece lens 67 is not blocked in the OVF mode.

The traveling path of the light flux reflected off the movable mirror 65e is changed by an angle $\beta$ in accordance with the angle $\alpha$ by which the angle of the movable mirror 65e is changed. The angle $\beta$ is twice the angle $\alpha$ ($\beta=2\times\alpha$). To put it the other way around, the angle by which the movable mirror 65e is rotated to change the angle of the optical path of the reflected light by the angle $\beta$ can be the angle $\alpha$, which is only one-half the angle $\beta$. That is, rotating the movable mirror 65e by a relatively small angle allows the traveling direction of the reflected light to be changed by a relatively large angle. Further, since the movable mirror 65e and the imaging device 7 are disposed in positions spaced apart from each other by a relatively long distance, rotating the movable mirror 65e by a small angle allows the two types of light reflected off the movable mirror 65e to be guided in a reliable manner to the eyepiece lens 67 and the imaging device 7, respectively, which are disposed in positions spaced apart from each other. That is, rotating the movable mirror 65e by a small angle allows the light flux reflected off the movable mirror 65e to selectively travel along one of the two optical paths in a satisfactory manner. Increase in space necessary for the rotation of the movable mirror 65e is thus minimized.

The imaging device 7 produces live-view images based on the subject image having been reflected off the movable mirror 65e, passed through the imaging lens 69, and reached the imaging device 7. Specifically, the imaging device 7 successively produces a plurality of images at very short time intervals (1/60 second, for example). The acquired time-series images are successively displayed on the backside monitor 12. The user who is capturing an image can thus visually recognize video images (live-view images) displayed on the backside monitor 12 and determine a composition by using the video images.

In this case as well, the light incident on the AF module 20 via the primary mirror 61 and the secondary mirror 62 is used to carry out an AF action, as in the composition determination using the OVF (see FIG. 4).

As described above, the traveling path of the light flux to be viewed that has been reflected off the movable mirror 65e is switched between the optical path PA (FIG. 4), along which the light flux travels from the movable mirror 65e to the eyepiece lens 67 and the finder window 10, and the optical path PB (FIG. 5), along which the light flux travels from the movable mirror 65e to the imaging lens 69 and the imaging device 7, by changing the angle of reflection of the light flux with respect to the movable mirror 65e.

Therefore, in the imaging apparatus 1, among the plurality of mirrors 65a, 65b, and 65e, which form the pentamirror 65, the angle of reflection with respect to one of the reflection surfaces (movable mirror 65e) is changed, whereas the other reflection surfaces (roof mirror 65a/65b) are stationary. That is, among the plurality of reflection surfaces, the traveling path of the light flux to be viewed is changed by driving only one reflection surface 65e, whereby a compact configuration with a smaller number of driven portions can be achieved.

The optical finder 17 in the imaging apparatus 1 will next be described in detail.

[Configuration of Optical Finder 17]

Figure 7:
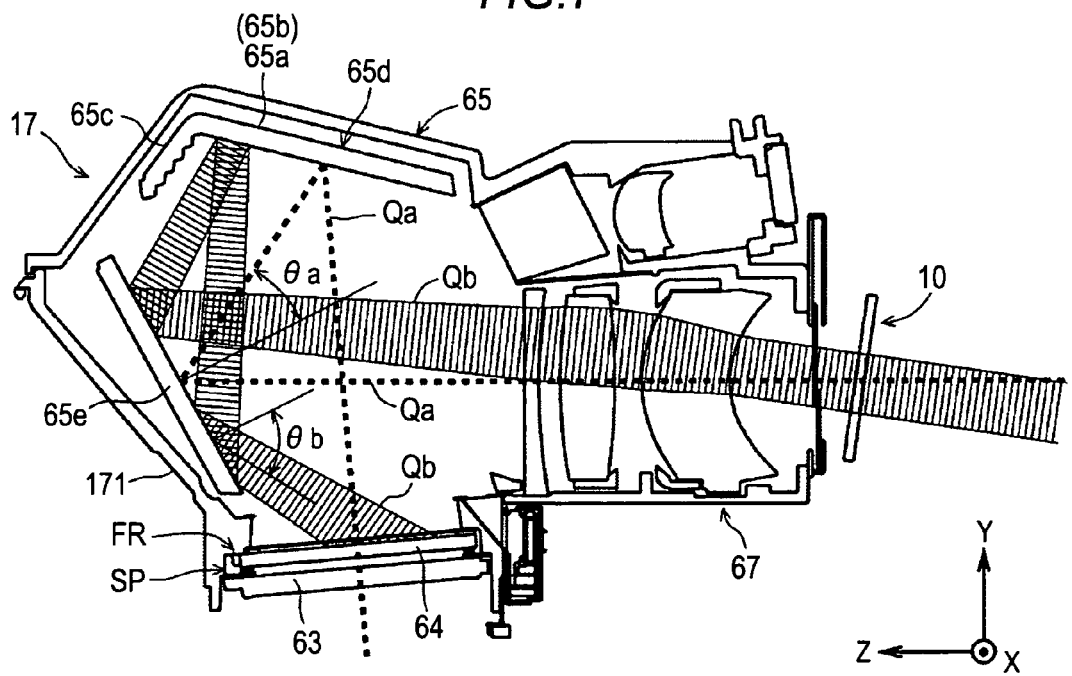
FIG. 7 is a descriptive diagram of the configuration of an optical finder.
Figure 8:
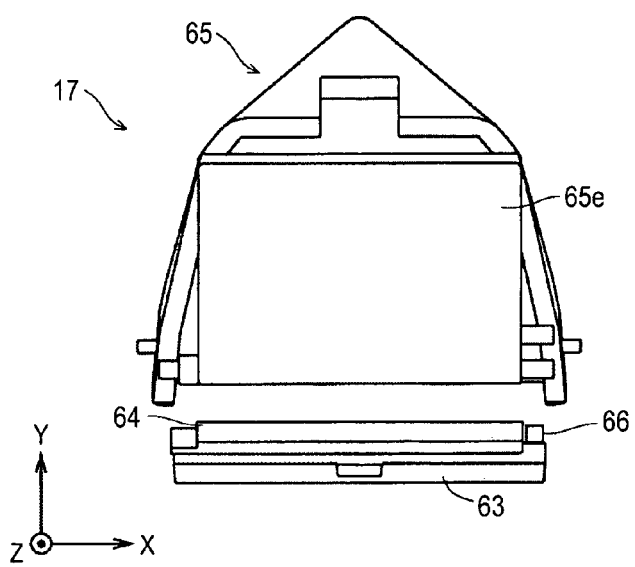
FIG. 8 is another descriptive diagram of the configuration of the optical finder.
Figure 9:
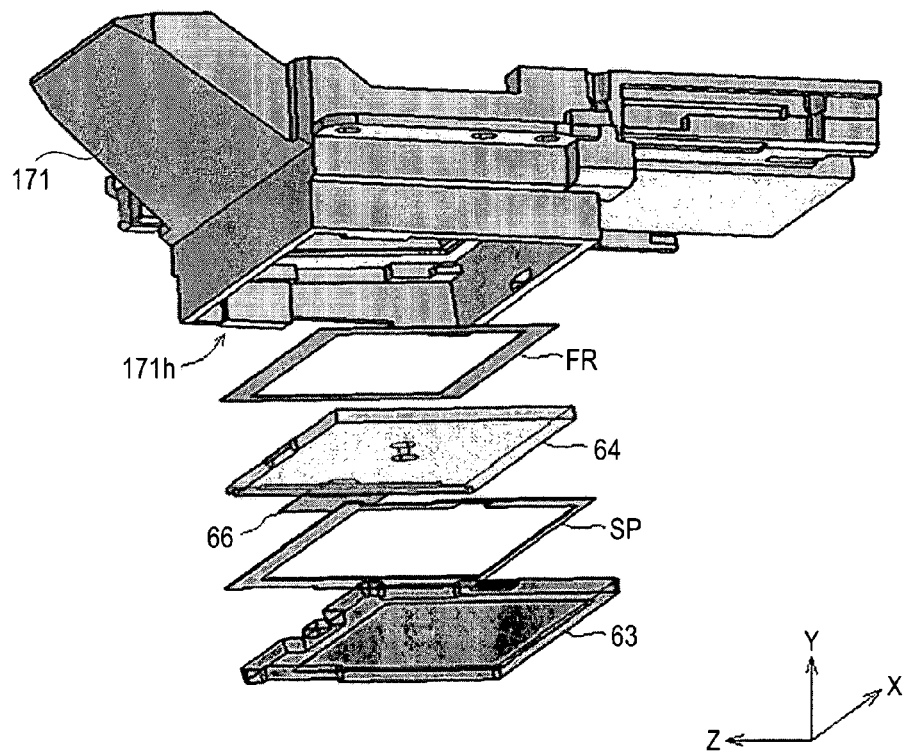
FIG. 9 is another descriptive diagram of the configuration of the optical finder.

FIGS. 7 to 9 are descriptive diagrams for describing the configuration of the optical finder 17. FIG. 7 is a longitudinal cross-sectional view of the optical finder 17. FIG. 8 is a front view of the optical finder 17 (viewed in the −Z direction). FIG. 9 is an exploded perspective view of a lower portion of the optical finder 17.

As shown in FIG. 9, the optical finder 17 includes a finder base plate 171 configured as a lower housing of the optical finder 17, and the focus plate 63 and the in-finder LCD 64 described above, a rectangular frame-shaped spacer SP interposed between the focus plate 63 and the in-finder LCD 64, and a frame member FR disposed on the in-finder LCD 64 are accommodated in an opening portion 171h of the finder base plate 171. In the optical finder 17, the illumination LED 66 is disposed next to the in-finder LCD 64 in the horizontal direction (−X direction), as shown in FIGS. 8 and 9.

Figure 10:
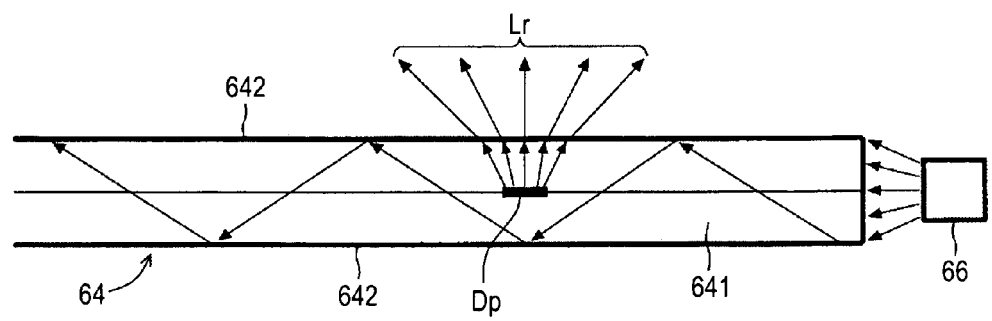
FIG. 10 is a descriptive diagram for describing the behavior of light emitted from an illumination LED and incident on a liquid crystal layer.

The arrangement of the in-finder LCD 64 and the illumination LED 66 described above allows the light (red light) from the illumination LED 66 incident on a side surface of the liquid crystal layer (liquid crystal display device) 641 in the in-finder LCD 64 to travel between the two glass substrates 642 disposed above and below the liquid crystal layer 641 and undergo repeated total reflection, as shown in FIG. 10. When a specific portion of the liquid crystal layer 641, in which polymer dispersed liquid crystal molecules are sealed, is brought into a diffused state so that an indication Dp, such as one of the AF areas Fe shown in FIG. 11, is displayed, the light from the illumination LED 66 is scattered at the location where the indication Dp is displayed. Scattered light Lr therefore exits through the glass substrates 642. When the scattered light Lr having exited through the glass substrates is guided along the optical path Qa (broken line) of the subject light shown in FIG. 7 to the finder window 10, the user who is capturing an image and looking into the finder window 10 can visually recognize a superimposed indication, such as the AF areas Fe (FIG. 11) colored in red.

On the other hand, the scattered light Lr produced by the illumination light from the illumination LED 66 at the location of the liquid crystal layer 641 where the indication Dp is displayed as well as scattered light produced not only in the portion of the liquid crystal layer 641 other than the presented indication and hence in the transmitting state but also in the surfaces of glass substrates 642 (the amount of scattered light of this type is not large but is non-negligible) travel along an optical path Qb (portion hatched by parallel lines) shown in FIG. 7, are sequentially reflected off the movable mirror 65e and the roof mirror 65a/65b, are reflected off the movable mirror 65e again, and disadvantageously reach the finder window 10. As a result, ghost images Fg of the AF areas Fe colored in red, for example, are produced in an upper area (hereinafter also referred to as a "ghost produced area") Eu in the finder window 10, as shown in FIG. 11.

A detailed description will now be made of reflection characteristics of the movable mirror 65e for suppressing the ghost images Fg in the present embodiment.

[Reflection Characteristics of Movable Mirror 65e]

Figure 12:
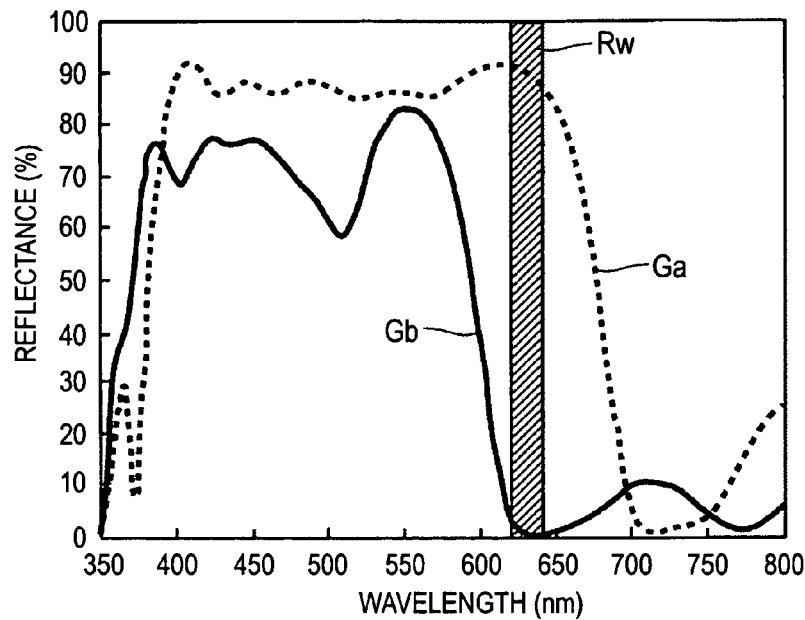
FIG. 12 shows graphs for describing reflection characteristics of a movable mirror.

FIG. 12 shows graphs for describing the reflection characteristics of the movable mirror 65e. In FIG. 12, the horizontal axis represents the wavelength of light, and the vertical axis represents the spectral reflectance.

In the optical finder 17, when a composition is determined by using the OVF (when the movable mirror 65e has the attitude shown in FIG. 4), the subject light having passed through the image capturing lens unit (image capturing optical system) 3 travels along the optical path Qa and impinges on the movable mirror 65e at an angle θa (θa≦37 degrees, for example), and the light reflected off the movable mirror 65e is guided to the finder window 10, as shown in FIG. 7. On the other hand, the scattered light Lr described above, which is produced in the in-finder LCD (liquid crystal display) 64 illuminated with the light from the illumination LED 66, and other light components (hereinafter also referred to as "ghost light") travel along the optical path Qb and impinge on the movable mirror 65e, which is the mirror closest to the in-finder LCD 64 among the plurality of mirrors that form the hollow pentamirror 65, at an angle θb (θb≧50 degrees, for example), and the finder window 10 is disposed also in the optical path Qb oriented in the direction in which the scattered light reflected off the movable mirror 65e travels.

That is, the subject light and the scattered light Lr described above to be superimposed on the subject light (hereinafter collectively referred to as "normal light") are incident on the movable mirror 65e at the angle θa, whereas the ghost light is incident on the movable mirror 65e at the angle θb, which differs from the angle θa, as shown in FIG. 7.

Looking at the difference in the angle of incidence with respect to the movable mirror 65e between the normal light and the ghost light, the present inventor provides the reflection characteristics of the movable mirror 65e with a dependence on the angle of incidence. The reflection characteristics of the movable mirror 65e may further be provided with a dependence on polarization in consideration of the fact that the primary component of the normal light, which is circularly polarized light, differs from the primary component of the ghost light, which is P-polarized light.

Specifically, the movable mirror 65e is configured to have not only a spectral reflectance characteristic Ga (broken line) in which the movable mirror 65e well reflects light incident at the angle θa (FIG. 7) and having wavelengths across the visible light range but also a bandpass spectral reflectance characteristic Gb (solid line) in which the movable mirror 65e does not reflect all the light incident at the angle θb (FIG. 7) but the reflectance within a wavelength range Rw (area hatched by parallel lines) corresponding to the red light radiated from the illumination LED 66 approaches "0", as shown in FIG. 12. Since the amount of light emitted from the in-finder LCD 64 (red light), incident on the movable mirror 65e at the angle θb, and reflected off the movable mirror 65e as the ghost light as shown in FIG. 7 is suppressed, the ghost phenomenon that occurs in the ghost produced area Eu (FIG. 11) in the finder window 10 can be suppressed. On the other hand, since the amount of light incident on the movable mirror 65e at the angle θa and reflected off the movable mirror 65e as the normal light (visible light) is maintained in a satisfactory manner, the subject image and the superimposed indication produced by the in-finder LCD 64 can be visually recognized in the finder window 10 in an appropriate manner.

The configuration of the movable mirror 65e for achieving the reflection characteristics described above will be described with reference to FIG. 13.

Figure 13:
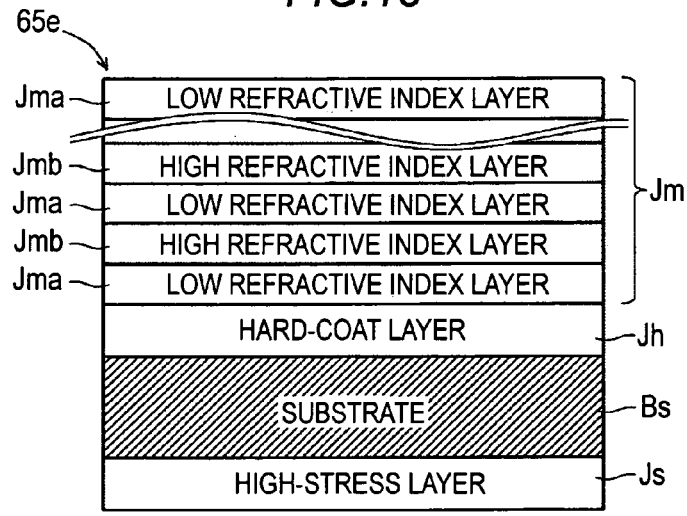
FIG. 13 is a descriptive diagram for describing a cross-sectional structure of the movable mirror.

FIG. 13 is a descriptive diagram for describing a cross-sectional structure of the movable mirror 65e.

Figure 14:
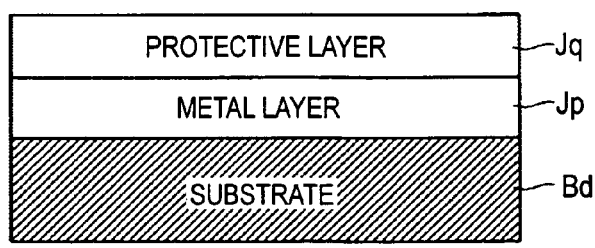
FIG. 14 is a descriptive diagram for describing a cross-sectional structure of a mirror used as a pentamirror according to related art.

In the movable mirror 65e, a dielectric multilayer film is formed by deposition on the front surface (upper surface) of a mirror substrate Bs. The dielectric multilayer film has at least ten layers formed by alternately stacking a layer Jma made of $SiO_2$, $MgF_2$, or any other suitable low refractive index material and a layer Jmb made of $TiO_2$, $Ta_2O_5$, or any other suitable high refractive index material. A mirror layer (mirror film) Jm formed of the dielectric multilayer film described above can appropriately achieve the reflection characteristics shown in FIG. 12. On the other hand, a mirror used as a pentamirror of relate art has a simple cross-sectional structure having a metal layer Jp made of silver or aluminum and a protective layer Jq provided on a mirror substrate Bd, as shown in FIG. 14, and the structure of this type may not achieve the special reflection characteristics shown in FIG. 12.

Film stress produced when the mirror layer Jm formed by coating the multilayer film having at least 10 layers on the front surface of the mirror substrate Bs is deposited as shown in FIG. 13 may cause warpage of the mirror substrate Bs in some cases. Since any warpage of the mirror substrate Bs degrades the surface flatness and hence the optical performance thereof, the mirror substrate Bs is preferably made of a glass material having high rigidity.

When it is necessary to use a plastic material or any other similar material having low rigidity as the material of the mirror substrate Bs, for example, because the movable mirror 65e has a complicated shape, a high-stress layer Js deposited to have film stress comparable to that in the mirror layer Jm is formed on the back surface of the mirror substrate Bs, as shown in FIG. 13. When the mirror layer (mirror film) Jm having the reflection characteristics shown in FIG. 12 is provided on one side of the mirror substrate Bs and the high-stress layer (predetermined film) Js having film stress comparable to that in the mirror layer Jm is provided on the other side of the mirror substrate Bs, the film stress on one side of the mirror substrate Bs balances with the film stress on the other side of the mirror substrate Bs and hence the film stress in the mirror layer Jm cancels the film stress in the high-stress layer Js, whereby deformation (warpage) of the mirror substrate Bs can be suppressed.

When the high-stress layer Js coated on the back surface of the mirror substrate Bs does not have the surface facing the substrate Bs being mirror finished, or when a significant structure (an ejector mark left in a parting process, for example) is present on the back surface of the mirror substrate Bs in the area where the high-stress layer Js is coated, the adherence between the mirror substrate Bs and the high-stress layer Js is affected, resulting in separation or cracking in some cases. It is therefore preferable that the surface of the high-stress layer Js is mirror finished to the state comparable to that of the mirror layer Jm on the front surface of the mirror substrate Bs or any significant structure on the back surface of the mirror substrate Bs is located outside the area where the high-stress layer Js is coated.

Further, the movable mirror 65e may include a hard-coat layer Jh between the mirror substrate Bs and the mirror layer Jm, as shown in FIG. 13, to suppress initial cracking due to thermal shock.

In the imaging apparatus 1 including the thus configured movable mirror 65e, since the movable mirror 65e has reflection characteristics (FIG. 12) in which the spectral reflectance associated with the wavelength corresponding to red light incident at the angle θb (FIG. 7) is lower than the spectral reflectance associated with the wavelength corresponding to red light incident at the angle θa (FIG. 7), an anti-ghost part (member) is not particularly necessary, whereby the visibility of a ghost image in the finder window 10 due to scattered light produced in the in-finder LCD 64 can be lowered without a complicated configuration of the optical finder 17 or increase in the size thereof. Further, since the primary component of the ghost light (scattered light produced in the in-finder LCD 64) is P-polarized light, the amount of ghost light reflected off the movable mirror 65e can be effectively reduced particularly by lowering the spectral reflectance associated with the wavelength corresponding to red P-polarized light incident at the angle θb in the reflection characteristics of the movable mirror 65e.

The movable mirror 65e does not necessarily have the reflection characteristics shown in FIG. 12. Instead, shifting the movable mirror 65e forward (in the +Z direction in FIG. 7) in the pentamirror 65 shifts the ghost produced area Eu shown in FIG. 11 upward relative to the finger window 10. No ghost image will be viewed by shifting the ghost produced area Eu out of the screen in the finder window 10. The method described above, however, disadvantageously results in an increase in size of the optical finder 17 by the amount of forward shift of the movable mirror 65e. The method of the present embodiment, which will not increase the size of the optical finder 17, is effective in this regard.

<Variations>

In the embodiment described above, the movable mirror 65e does not need to have the reflection characteristics shown in FIG. 12. Instead, any of the fixed mirrors may have the reflection characteristics.

The illumination LED 66 in the embodiment described above does not necessarily emit light having a wavelength corresponding to red toward the in-finder LCD 64, but may instead emit light having a wavelength corresponding to any other color (blue, for example). In this case, the amount of ghost light reflected off the movable mirror 65e can be appropriately reduced by providing the movable mirror 65e with reflection characteristics in which the spectral reflectance associated with the wavelength corresponding to the other color of the light incident on the movable mirror 65e at the angle θb is lowered.

In the embodiment described above, the pentamirror 65 is not necessarily incorporated in a single lens reflex digital camera, but may be incorporated in a single lens reflex silver-salt film camera.

The invention has been described in detail, but the above description is presented by way of example in every aspect and the invention is not limited thereto. It should be construed that a large number of variations that have not been presented can be contemplated without departing from the scope of the invention.

The present application contains subject matter related to that disclosed in Japanese Priority Patent Application JP 2009-211915 filed in the Japan Patent Office on Sep. 14, 2009, the entire contents of which is hereby incorporated by reference.

What is claimed is:

1. An imaging apparatus comprising:
    optical finder means for introducing subject light having passed through an image capturing optical system onto a predetermined mirror at a first angle and guiding light reflected off the predetermined mirror to a finder window;
    a liquid crystal display disposed in an optical path of the subject light in the optical finder means; and
    illumination means for illuminating the liquid crystal display with light having a predetermined wavelength,
    wherein scattered light produced in the liquid crystal display illuminated with the light from the illumination means is incident on the predetermined mirror at a second angle,
    the finder window is disposed in a path of the scattered light reflected off the predetermined mirror, and
    the predetermined mirror has reflection characteristics in which spectral reflectance associated with the predetermined wavelength of the light incident at the second angle is lower than the spectral reflectance associated with the predetermined wavelength of the light incident at the first angle.

2. The imaging apparatus according to claim 1,
    wherein a primary component of the scattered light is P-polarized light, and
    the spectral reflectance associated with the predetermined wavelength of the P-polarized light incident on the predetermined mirror at the second angle is lowered in the reflection characteristics.

3. The imaging apparatus according to claim 1,
    wherein a plurality of mirrors form a hollow pentamirror and the predetermined mirror is one of the plurality of mirrors.

4. The imaging apparatus according to claim 3,
    wherein the one mirror is a mirror closest to the liquid crystal display among the plurality of mirrors.

5. The imaging apparatus according to claim 1,
    wherein the predetermined mirror includes a mirror substrate, a mirror film having the reflection characteristics and disposed on one side of the mirror substrate, and a predetermined film having film stress comparable to film stress in the mirror film and disposed on the other side of the mirror substrate.

6. The imaging apparatus according to claim 5,
    wherein the mirror film is formed by alternately stacking a low refractive index layer and a high refractive index layer.

7. An imaging apparatus comprising:

an optical finder unit configured to introduce subject light having passed through an image capturing optical system onto a predetermined mirror at a first angle and guiding light reflected off the predetermined mirror to a finder window;

a liquid crystal display disposed in an optical path of the subject light in the optical finder unit; and an illumination unit configured to illuminate the liquid crystal display with light having a predetermined wavelength, wherein scattered light produced in the liquid crystal display illuminated with the light from the illumination unit is incident on the predetermined mirror at a second angle, the finder window is disposed in a path of the scattered light reflected off the predetermined mirror, and the predetermined mirror has reflection characteristics in which spectral reflectance associated with the predetermined wavelength of the light incident at the second angle is lower than the spectral reflectance associated with the predetermined wavelength of the light incident at the first angle.

* * * * *